United States Patent
Carpenter et al.

(10) Patent No.: US 11,988,478 B1
(45) Date of Patent: May 21, 2024

(54) FIELD GUN STAND

(71) Applicant: Icon Outdoors, LLC, Olive Branch, MS (US)

(72) Inventors: Justin Carpenter, Olive Branch, MS (US); Jamie Spence, Olive Branch, MS (US)

(73) Assignee: Icon Outdoors, LLC, Olive Branch, MS (US)

( * ) Notice: Subject to any disclaimer, the term of this patent is extended or adjusted under 35 U.S.C. 154(b) by 0 days.

(21) Appl. No.: 18/083,914

(22) Filed: Dec. 19, 2022

(51) Int. Cl.
*F41A 23/18* (2006.01)
*A45F 3/44* (2006.01)
*F16M 11/28* (2006.01)

(52) U.S. Cl.
CPC ............. *F41A 23/18* (2013.01); *A45F 3/44* (2013.01); *F16M 11/28* (2013.01)

(58) Field of Classification Search
CPC . F41A 23/18; A45F 3/44; F16M 11/28; A47F 7/0021; A47F 7/0028; A47F 5/04; A47F 5/10; A47F 5/05; A47F 5/06; A47B 81/00; A47B 81/005; A47G 25/0664
USPC ........ 211/64, 196, 205, 85.7, 70.8; 248/530, 248/533, 156; 42/94
See application file for complete search history.

(56) References Cited

U.S. PATENT DOCUMENTS

| | | | | |
|---|---|---|---|---|
| 2,158,623 A | * | 5/1939 | Fischbacher | A47B 81/005 |
| | | | | 211/180 |
| 2,173,024 A | * | 9/1939 | Park | A45F 3/44 |
| | | | | 126/30 |
| 2,625,985 A | | 1/1953 | Morgan et al. | |
| 3,007,581 A | | 11/1961 | Moore | |
| 3,076,557 A | * | 2/1963 | Husted | A47J 37/0763 |
| | | | | 248/156 |
| 3,746,177 A | | 7/1973 | Vilotti | |
| 3,952,878 A | | 4/1976 | Gorham | |
| 3,995,796 A | * | 12/1976 | Kline | A47K 1/08 |
| | | | | 248/156 |
| 4,089,423 A | * | 5/1978 | Gorham | F41A 23/18 |
| | | | | 248/156 |
| 4,144,971 A | * | 3/1979 | Balibrea | F41A 23/18 |
| | | | | 248/156 |
| 4,271,969 A | | 6/1981 | Gnesa | |
| 4,318,567 A | * | 3/1982 | Guthier | A47C 9/10 |
| | | | | 297/188.21 |
| 4,696,461 A | * | 9/1987 | Zelinski | B25B 11/00 |
| | | | | 269/287 |
| 4,765,277 A | * | 8/1988 | Bailey | E04H 12/182 |
| | | | | 248/407 |
| 4,936,038 A | | 6/1990 | Johnson et al. | |
| 4,936,531 A | * | 6/1990 | Bauser | B60N 3/00 |
| | | | | 248/125.3 |
| 5,022,536 A | * | 6/1991 | Pierson | F41A 17/02 |
| | | | | 42/70.11 |
| 5,293,889 A | | 3/1994 | Hall et al. | |
| 5,417,334 A | * | 5/1995 | Wu | A63B 55/20 |
| | | | | 248/156 |

(Continued)

*Primary Examiner* — Jennifer E. Novosad
(74) *Attorney, Agent, or Firm* — Warren D. Schickli; Stites & Harbison PLLC

(57) ABSTRACT

A gun stand includes a support post, a tray assembly and a ground stake. A first telescoping connection connects the tray assembly to a first end of the support post. A second telescoping connection connects the ground stake to a second end of the support post. The two telescoping connections are independently adjustable.

24 Claims, 19 Drawing Sheets

(56) References Cited

U.S. PATENT DOCUMENTS

| | | | | |
|---|---|---|---|---|
| 5,470,038 | A * | 11/1995 | Clark | A45B 5/00 |
| | | | | 248/188.7 |
| 5,474,191 | A * | 12/1995 | Bergeron | A63B 55/10 |
| | | | | 206/315.9 |
| 5,553,717 | A | 9/1996 | Minneman et al. | |
| 5,626,379 | A * | 5/1997 | Scott | A47B 81/005 |
| | | | | 211/195 |
| 5,680,939 | A * | 10/1997 | Oliver | A47B 81/005 |
| | | | | 248/161 |
| 5,819,462 | A * | 10/1998 | Dockery | A47B 81/005 |
| | | | | 211/64 |
| 5,855,286 | A * | 1/1999 | Zaid | A47K 5/12 |
| | | | | 211/85.7 |
| 5,860,534 | A * | 1/1999 | Minneman | A47B 81/005 |
| | | | | 108/150 |
| 5,878,762 | A * | 3/1999 | Huang | A45B 23/00 |
| | | | | 248/122.1 |
| 6,129,252 | A * | 10/2000 | Jackson | B60R 7/14 |
| | | | | 224/406 |
| 6,619,082 | B1 * | 9/2003 | Bentley | A47B 81/005 |
| | | | | 70/58 |
| 6,732,985 | B1 * | 5/2004 | Cantrell | A45F 3/44 |
| | | | | 248/156 |
| 6,935,065 | B1 * | 8/2005 | Oliver | F41A 23/04 |
| | | | | 248/161 |
| 7,124,530 | B1 | 10/2006 | Clark | |
| 7,311,097 | B1 * | 12/2007 | Callis | F41B 5/1453 |
| | | | | 124/23.1 |
| D604,077 | S * | 11/2009 | Cardenas | D6/552 |
| 7,641,156 | B2 * | 1/2010 | Medders | A47G 7/041 |
| | | | | 248/150 |
| D611,558 | S * | 3/2010 | Freeman | D22/108 |
| 7,857,149 | B2 * | 12/2010 | Cummins | A47B 81/005 |
| | | | | 211/64 |
| 7,857,279 | B2 * | 12/2010 | Krasnicki | A45F 3/44 |
| | | | | 248/156 |
| 8,191,561 | B2 | 6/2012 | Brooks, III | |
| 8,393,482 | B2 * | 3/2013 | Durham | D06F 59/02 |
| | | | | 248/163.1 |
| 8,403,278 | B1 | 3/2013 | Kasbohm | |
| 8,695,935 | B1 | 4/2014 | Kasbohm | |
| 9,107,498 | B1 * | 8/2015 | Wooten | A47B 81/005 |
| 9,115,948 | B2 | 8/2015 | Murphey | |
| 9,610,901 | B2 | 4/2017 | Sheehan | |
| 11,110,867 | B2 * | 9/2021 | Franklin | A47F 7/0028 |
| 2002/0166928 | A1 * | 11/2002 | Johnson | F16M 13/022 |
| | | | | 248/156 |
| 2009/0189030 | A1 * | 7/2009 | Krasnicki | A45F 3/44 |
| | | | | 248/220.21 |
| 2011/0084038 | A1 * | 4/2011 | Zack | A47K 3/001 |
| | | | | 211/85.7 |
| 2014/0097222 | A1 * | 4/2014 | Robinson | B60R 7/14 |
| | | | | 224/401 |
| 2016/0076847 | A1 | 3/2016 | Franklin | |
| 2018/0170268 | A1 * | 6/2018 | Fisher | B60R 7/14 |

\* cited by examiner

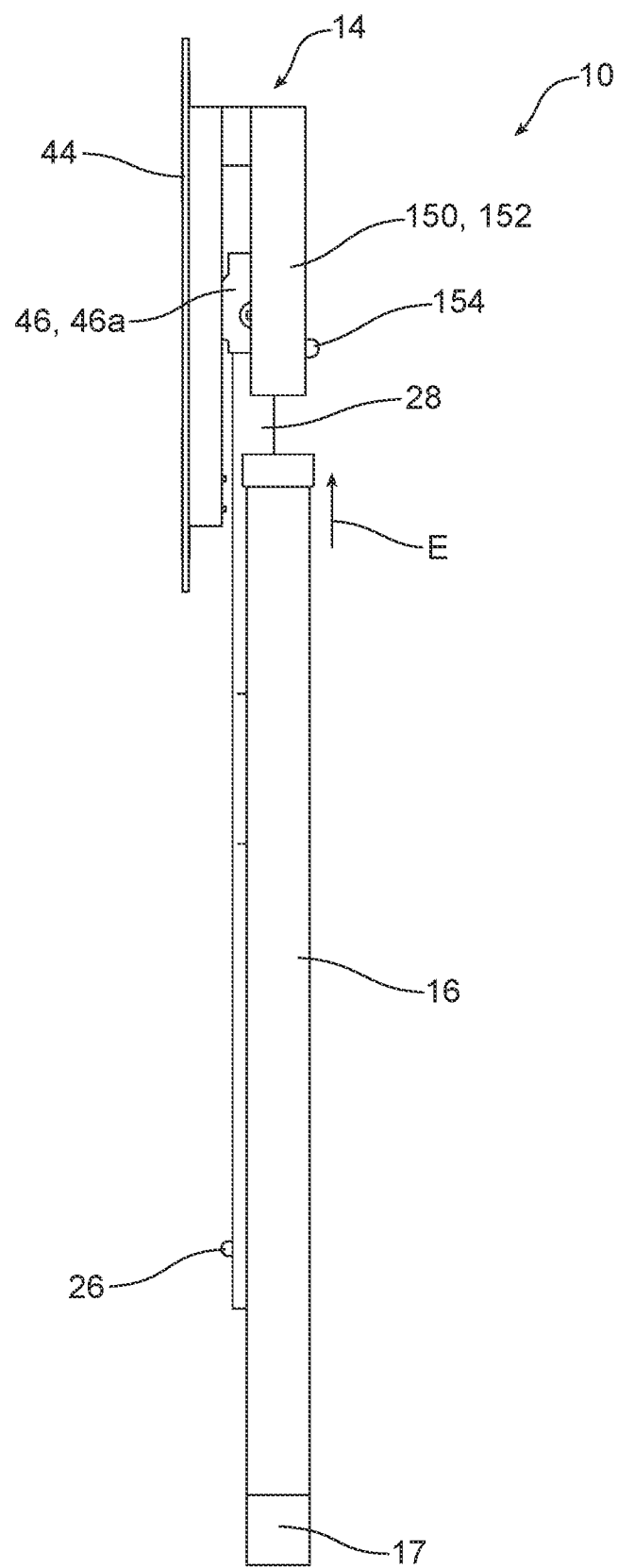

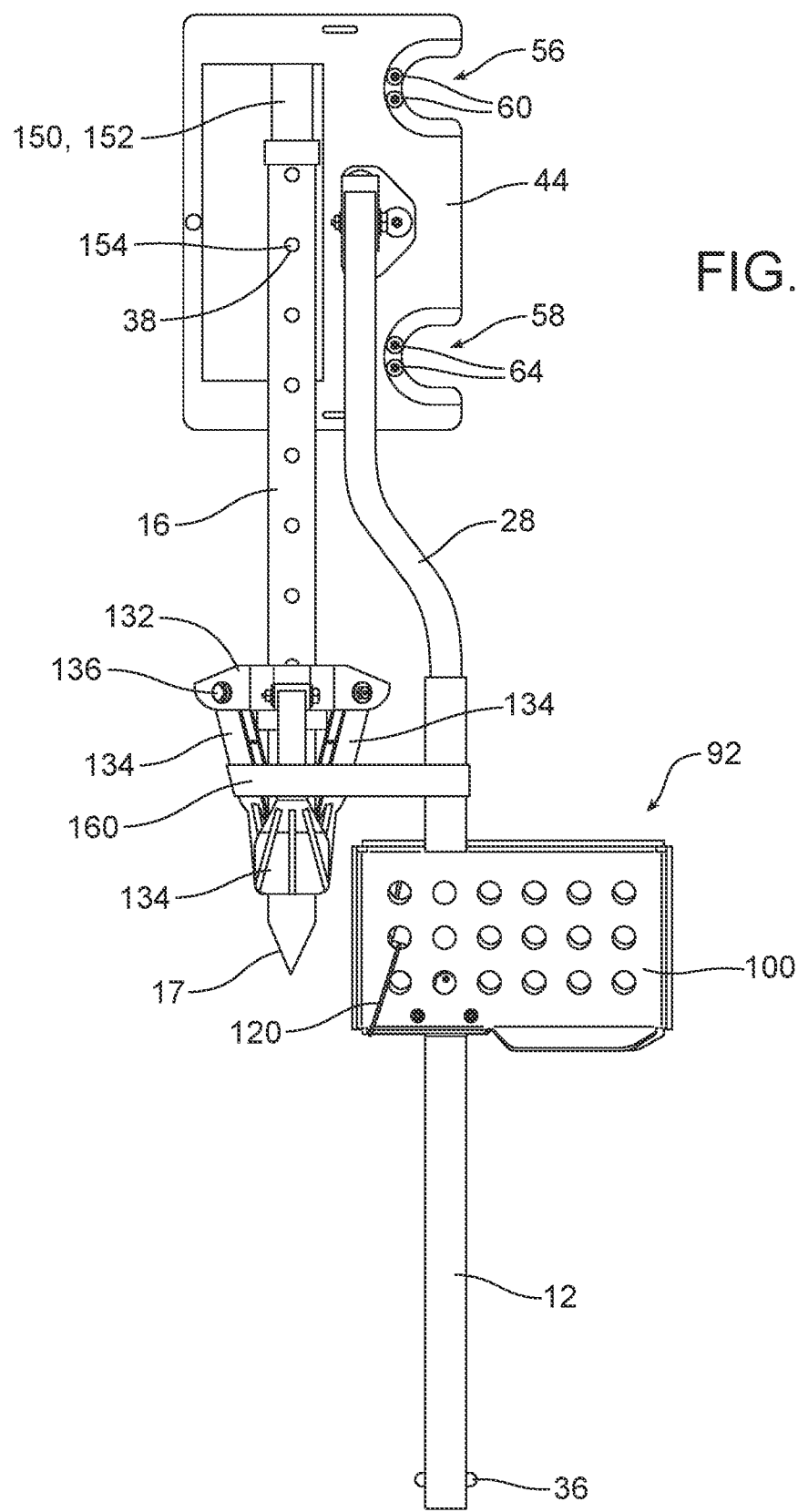

FIELD GUN STAND

TECHNICAL FIELD

This document relates generally to the hunting equipment field and, more particularly, to a new and improved gun stand particularly adapted for holding one or more guns in an easily accessed position in the field or even in shallow water environments.

BACKGROUND

Often a hunter will hunt from a blind or natural cover, sitting or standing for long periods of time. Success often requires that the hunter exhibits little or no movement which could give away the hunter's positon.

During these extended times the hunter may hold his weapon but that option interferes with the hunter's ability to use other hunting tools, including, for example, binoculars and calls. Not surprisingly, many hunters prefer to rest their weapons on a gun stand as that is less tiring than holding their weapon for long periods of time and it frees their hands for other purposes.

This document relates to a new and improved gun stand that: (a) provides a stable base on the ground or in shallow water, (b) height adjustability for different terrain and different hunting applications and (c) securely holds the weapon or gun in a readily retrievable position without interfering in any way with the ability of the hunter to rapidly grab the gun and manipulate the gun into a shooting position.

SUMMARY

In accordance with the purposes and benefits described herein, a new and improved gun stand is provided. That gun stand comprises: (a) a support post including a first end and a second end, (b) a tray assembly, (c) a first telescoping connection between the first end of the support post and the tray assembly, (d) a ground stake and (e) a second telescoping connection between the second end of the support post and the ground stake.

The gun stand may further include a gun stock support carried on the support post between the tray assembly and the ground stake. The gun stock support may be of a clam shell type having a first gun stack receiver and a second gun stack receiver. The gun stock support may be displaceable between a stowed position wherein the first gun stock receiver and the second gun stock receiver nest together along the support post and a deployed position wherein the first gun stock receiver and the second gun stock receiver project outwardly from the support post for supporting the stock of one or more guns, including shotguns, rifles or the like.

Still further, the gun stock support may further include (a) at least one mounting bracket adapted to secure the gun stock support to the support post, (b) a first hinge pivotally mounting the first gun stock receiver to the at least one mounting bracket and (c) a second hinge pivotally mounting the second gun stock receiver to the at least one mounting bracket. The gun stock support may also include a latch adapted to secure the first gun stock receiver and the second gun stock receiver in the stowed position. That latch may comprise an elastic cord and a locking nub carried on an end of the elastic cord.

In one or more of the many possible embodiments of the gun stand, the gun stand further includes a ground stabilizer carried on the ground stake. The ground stabilizer may include a plurality of mud feet that are pivotally attached to a support that is adapted to engage the ground stake.

In one or more of the many possible embodiments of the gun stand, the tray assembly includes a tray, a mounting stalk and a bracket adapted to secure the tray to the mounting stalk. That tray assembly may further include a pivot pin connecting the bracket to the mounting stalk whereby the tray is made displaceable between a stowed position substantially parallel to the mounting stalk and a use position substantially perpendicular to the mounting stalk.

In one or more embodiments, the tray includes a first gun barrel receiver. In one or more embodiments, the tray also includes a second gun barrel receiver. Still further, the tray may include at least one well adapted for receiving and holding gun ammunition.

The first gun barrel receiver may comprise a first open-ended channel formed in the tray and a first magnet carried on the tray adjacent a closed end of the first open-ended channel. The first magnet is adapted to bias a gun barrel toward the closed end of the first open-ended channel. Similarly, the second gun barrel receiver may comprise a second open-ended channel formed in the tray and a second magnet carried on the tray adjacent a closed end of the second open-ended channel. The second magnet is adapted to bias a gun barrel toward the closed end of the second open-ended channel.

In at least some embodiments, the gun stand includes a flexible pouch having a rigid mounting arm and the tray includes a receiver adapted to releasably receive the mounting arm to secure the flexible pouch on the tray. That receiver may be an elongated slot and the rigid mounting arm may include an offset lug adapted to be received in the elongated mounting slot.

Still further, the flexible pouch may include an access end and a cooperating cinch line and latch to selectively close and open the access end. The flexible pouch may also include at least one outboard pocket carried on a wall defining the access opening. That at least one outboard pocket may be made from a mesh material. An elastic lip may also be provided at an open end of the at least one outboard pocket.

In one or more of the many possible embodiments of the gun stand, the first telescoping connection includes (a) a first set of spaced apertures in a sidewall of the support post at the first end and (b) a first spring-loaded detent carried on the mounting stalk and adapted to engage in one aperture of the first set of spaced apertures. The second telescoping connection includes (a) a second set of spaced apertures in the ground stake and (b) a second spring-loaded detent carried on the support post adjacent the second end and adapted to engage in one aperture of the second set of spaced apertures. This arrangement advantageously allows for independent adjustment of both (i) a first length of the gun stand between the between the tray and the gun stock support and (ii) a second length of the gun stand between the gun stock support and the ground stabilizer.

In at least one embodiment of the gun stand, the gun stand further includes an auxiliary receiver carried on the tray assembly. The auxiliary receiver is adapted to receive and hold the ground stake when the ground stake is disconnected from the support post for transporting the gun stand in a collapsed condition. Such embodiments of the gun stand may also include a third spring-loaded detent carried on the auxiliary receiver and adapted to engage in one aperture of the set of spaced apertures in the ground stake when the ground stake is held on the auxiliary receiver so as to extend beside and parallel to the support post. In this collapsed or consolidated position, the gun stand is easier to carry to and from a hunting site.

In accordance with an additional aspect, a new and improved gun stand comprises: (a) a support post, (b) a tray carried at a first end of the support post, (c) an auxiliary receiver carried on the tray and (d) a ground stake wherein in the deployed position the ground stake is connected to a second end of the support post but in a transporting position the ground stake is connected to the auxiliary receiver so as to extend parallel to and alongside the support post.

In the following description, there are shown and described several embodiments of the new and improved gun stand. As it should be realized, the gun stand is capable of other, different embodiments and its several details are capable of modification is various, obvious aspects all without departing from the gun stand as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the gun stand and together with the description serve to explain certain principles thereof.

FIG. 10 is a detailed side elevational view of how the ground stake is connected to the auxiliary receiver carried on the tray to hold the gun stand in a collapsed or consolidated position for more convenient transport from site to site.

FIG. 11 is a side elevational view of the full gun stand in the collapsed or consolidated position.

Reference will now be made in detail to the illustrated embodiments of the gun stand, examples of which are illustrated in the accompanying drawing figures.

DETAILED DESCRIPTION

Figure 1:
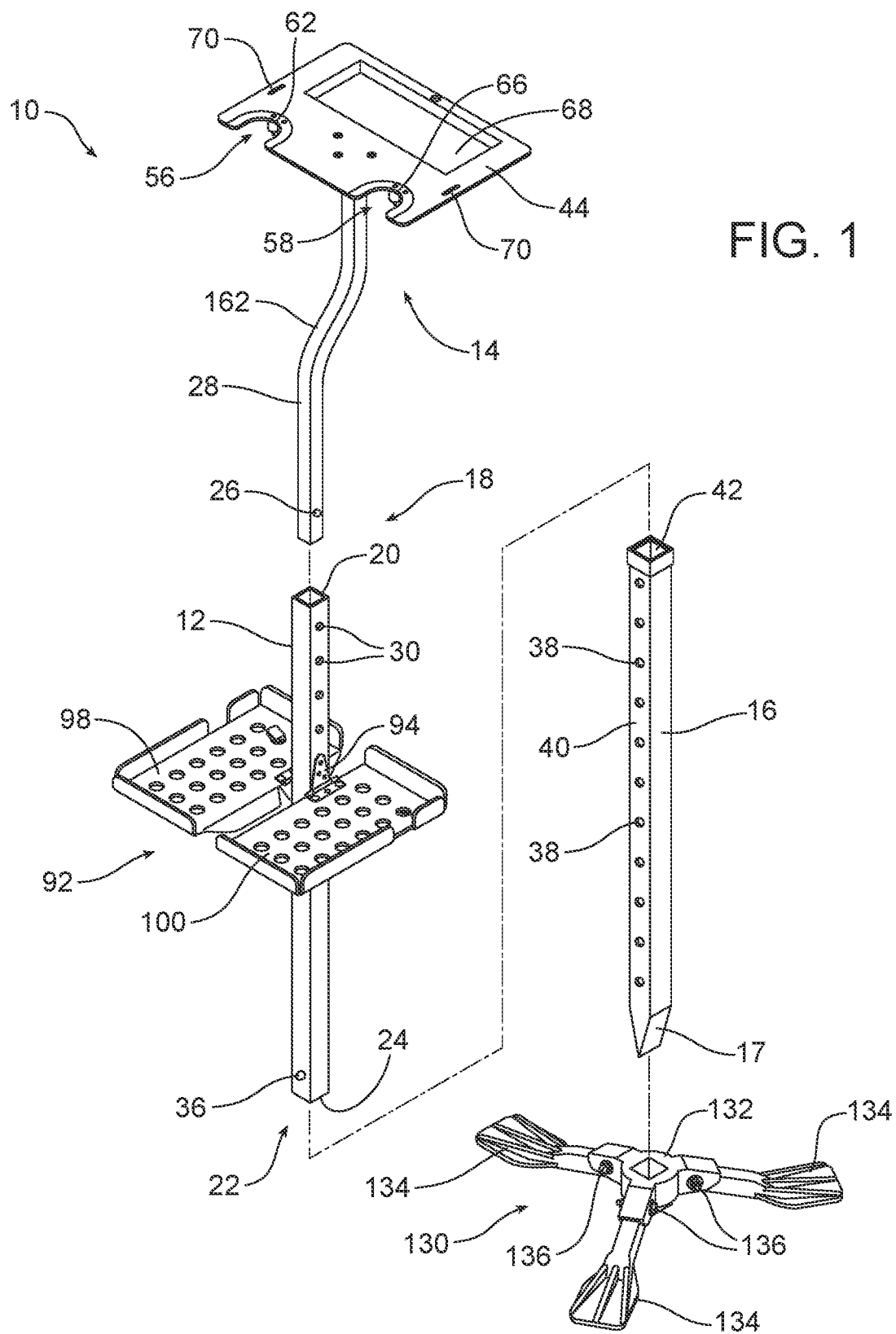
FIG. 1 is a partially exploded, perspective view of the new and improved gun stand.
Figure 2:
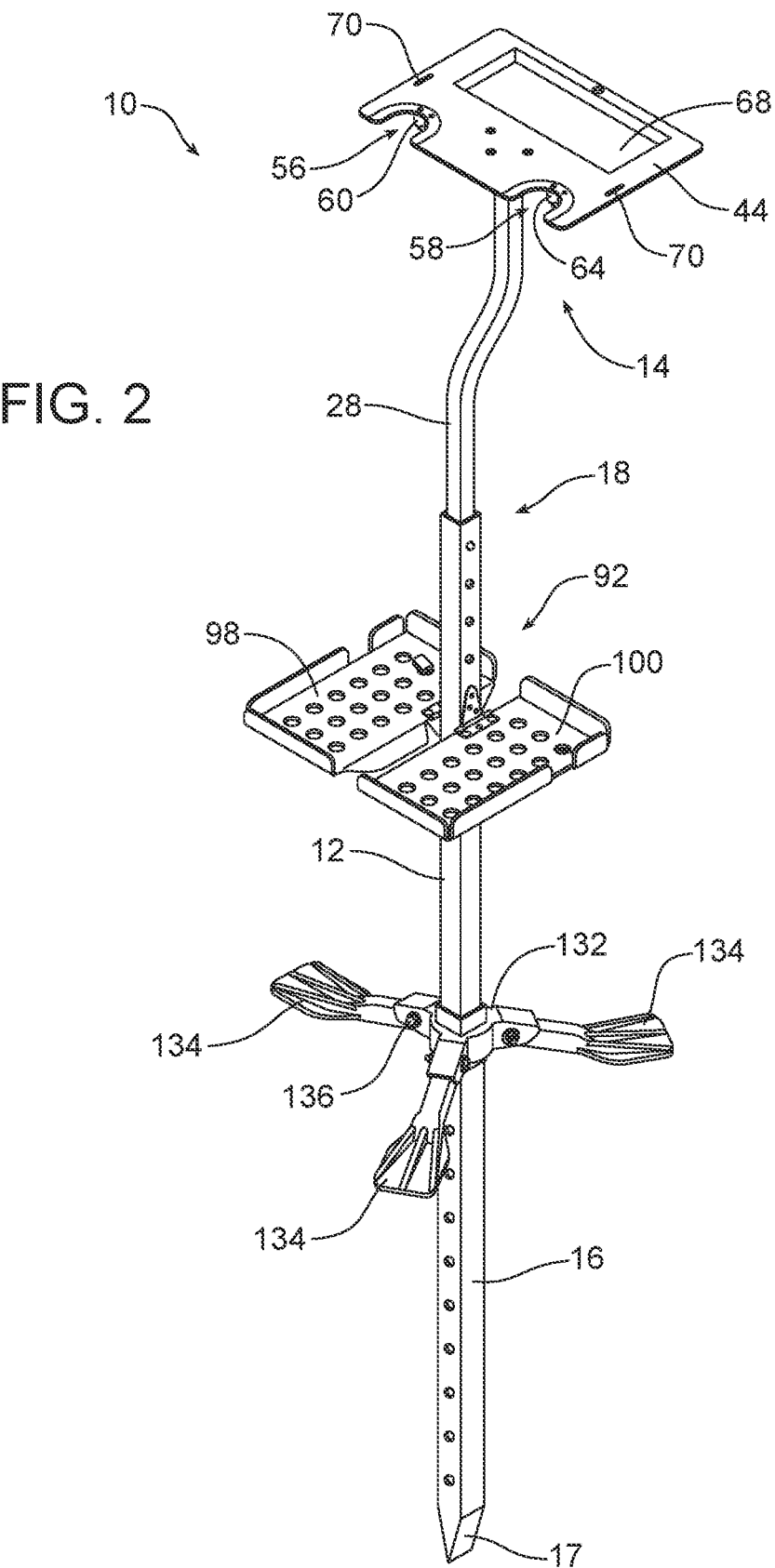
FIG. 2 is a perspective view of the assembled gun stand.
Figure 3:
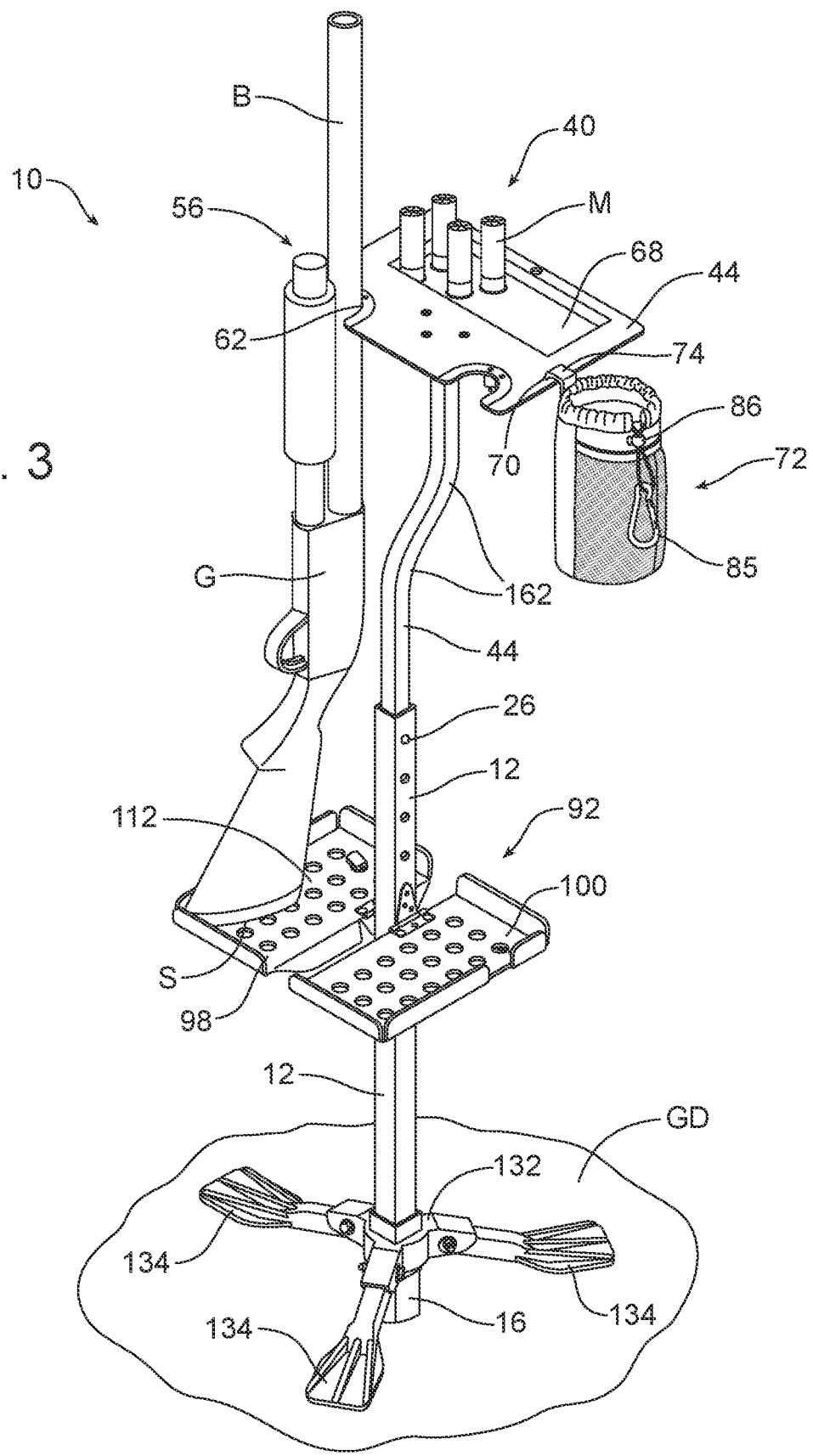
FIG. 3 is a perspective view of the gun stand similar to FIG. 2 but showing (a) a gun, in the form of a shot gun, held on the gun stand, (b) four shot gun shells held in the well of the tray and (c) a flexible pouch connected by a support arm to a receiver of the tray.

Reference is now made to FIGS. 1-3 which illustrate the new and improved gun stand 10. The gun stand 10 includes a support post 12, a tray assembly 14 and a ground stake 16. The ground stake 16 includes a tapered end 17 adapted to be inserted into the ground in order to anchor the gun stand 10 for use. A first telescoping connection 18 releasably connects the tray assembly 14 to a first end 20 of the support post 12. See also FIG. 4. A second telescoping connection 22 releasably connects the ground stake 16 to a second end 24 of the support post 12. See also FIG. 5. FIG. 1 is an exploded view showing the tray assembly 14 and ground stake 16 disconnected from the support post 12. FIG. 2 illustrates the gun stand 10 in an assembled condition with the tray assembly 14 and the ground stake 16 connected to the support post 12.

Figure 4:
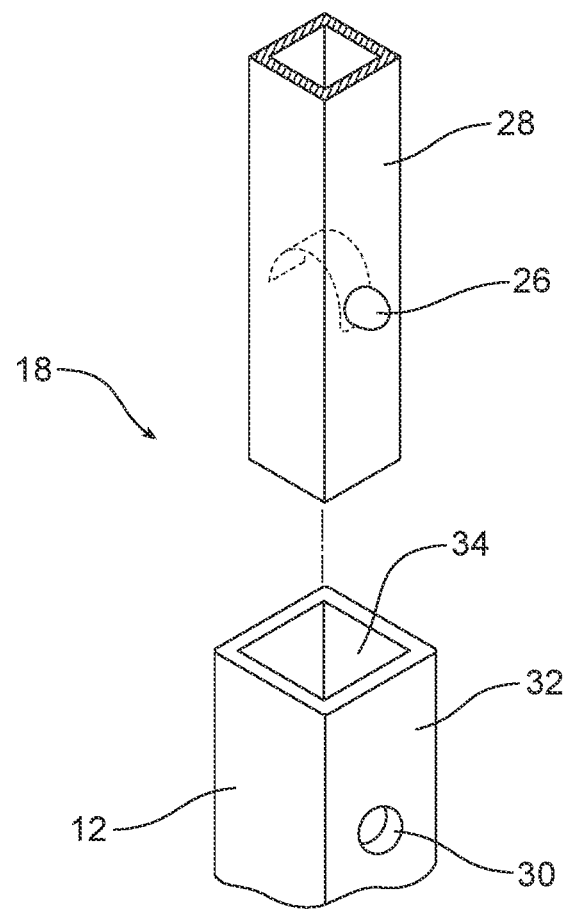
FIG. 4 is a detailed perspective view of the first telescoping connection between the mounting stalk of the tray assembly and the support post at the first end of the support post.

FIG. 4 is a detailed illustration of the first telescoping connection 18 which comprises (a) a spring loaded detent 26, of a type known in the art, carried on the mounting stalk 28 of the tray assembly 14 and (b) a cooperating set of spaced apertures 30 in a sidewall 32 of the support post 12. The mounting stalk 28 is sized and shaped for receipt and sliding movement in the lumen 34 of the support post 12. This allows for telescoping length adjustment: that is, one can adjust how far the tray assembly 14 projects from the first end 20 of the support post 12.

Figure 5:
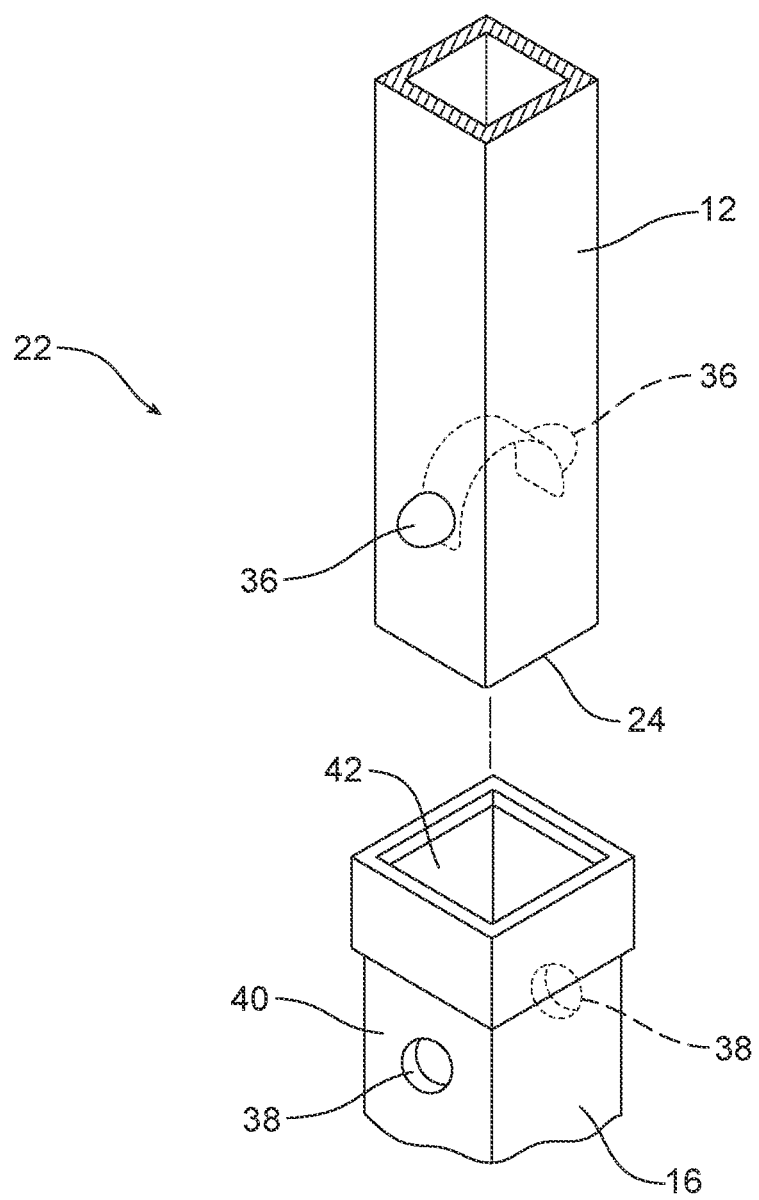
FIG. 5 is a detailed perspective view of the second telescoping connection between the ground stake and the support post at the second end of the support post.

FIG. 5 is a detailed illustration of the second telescoping connection 22 which comprises (a) a spring loaded double detent 36, of a type known in the art, carried on the support post 12 and (b) a cooperating set of spaced apertures 38 in opposing sidewalls 40 of the ground stake 16. The support post 12 is sized and shaped for receipt and sliding movement in the lumen 42 of the ground stake 16. This allows for telescoping length adjustment: that is, one can adjust how far the support post 12 projects above the ground stake 16.

It should be appreciated that the two telescoping adjustments allowed by the first and second telescoping connections 18, 22 are independently adjustable. This helps maximize the versatility of the gun stand 10 for substantially any application in the field whether that is for use on solid ground, on soft ground or even in shallow water.

As best illustrated in FIGS. 1-3 and 6A-6D, the tray assembly 14 includes (a) a tray 44, (b) the mounting stalk 28, referenced above, and (c) a bracket 46 adapted to secure the tray to the mounting stalk. The bracket 46 is secured to the bottom of the tray 44 by any appropriate means known in the art. A pivot pin 48 connects the bracket 46 to the mounting stalk 28.

More specifically, the bracket 46 has two legs 46a, 46b that form a clevis with a locking cavity 47 between the legs. The pivot pin 48 is received by and extends through (a) opposing holes in the legs 46a, 46b of the bracket 46 and (b) an elongated slot 50 provided in the mounting stalk 12 adjacent the upper end. This arrangement allows the tray 44 to be selectively displaced between (a) a use position extending substantially perpendicular to the mounting stalk 28 (see FIGS. 1-3, 6A and 6D) and (b) a stowed position wherein the tray 44 extends substantially parallel to and besides the mounting stalk 28 (see FIGS. 6B and 6C). When the tray 44 is locked in the use position, the pivot pin 48 rests at the lower end 52 of the elongated slot 50 and the top end of the mounting stalk 28 sits snugly in the locking cavity 47 between the legs 46a, 46b of the bracket 46 with the bottom wall of the tray resting against the top end of the mounting stalk. Thus, the tray 44 is positively supported in the use position.

To displace the tray 44 from the use position to the stowed position, one lifts the tray 44 on the mounting stalk 28 (see FIG. 6A and note action arrow A) so that the pivot pin 48 slides through the elongated slot 50 to the upper end 54. This provides clearance between the bottom of the tray 44 and the top end of the mounting stalk 28 so that the user can then pivot the tray 44 as shown by action arrow B in FIG. 6B into a position substantially parallel to and alongside the mounting stalk 28. After pivoting, one slides the tray 44 back down along the mounting stalk 28 (see FIG. 6C and note action arrow C) until the pivot pin 48 is again received at the lower end 52 of the elongated slot 50 and the top end of the mounting stalk 28 engages the bracket 46 so that the tray is secured against pivoting in the stowed position.

Figure 6A:
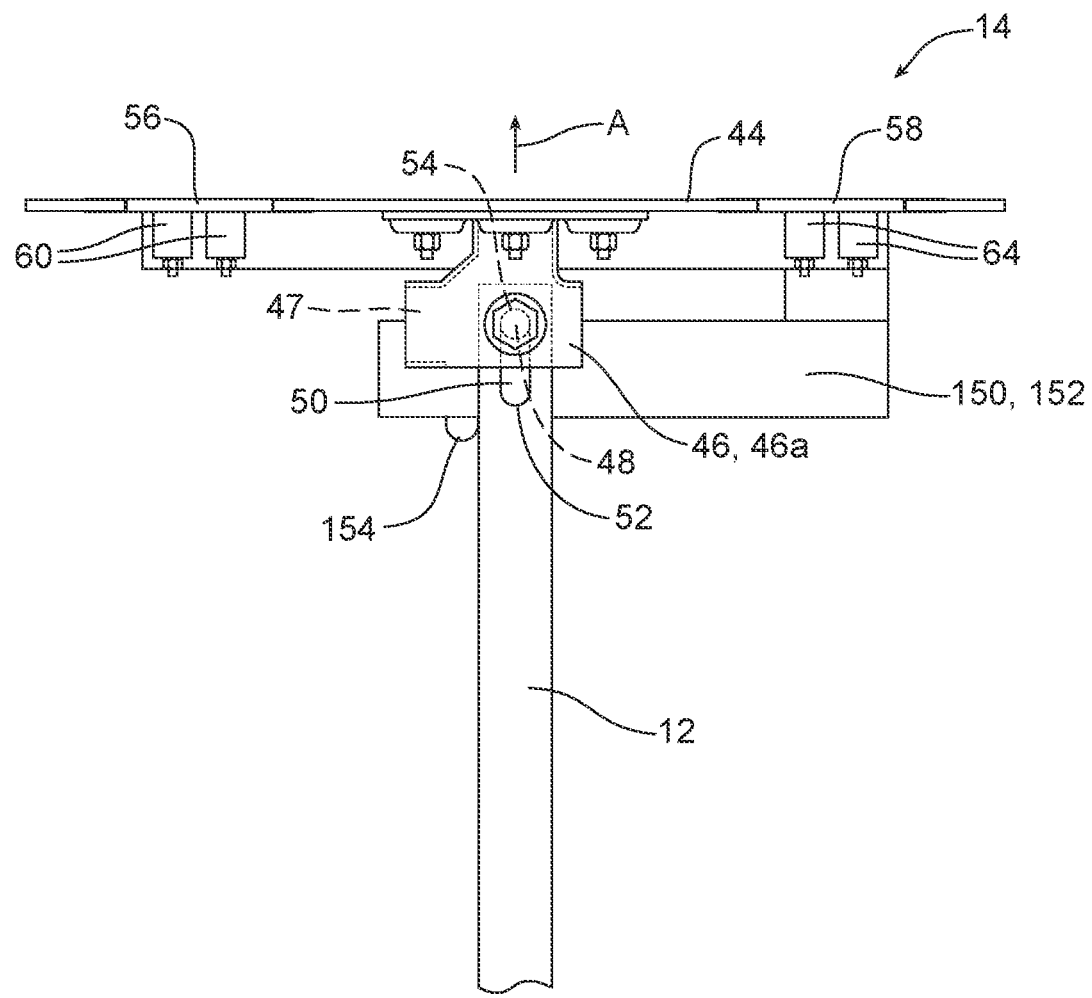
FIGS. 6A-6C are a series of detailed side elevational views illustrating how the tray is displaced from the use position to the stowed position.
Figure 6B:
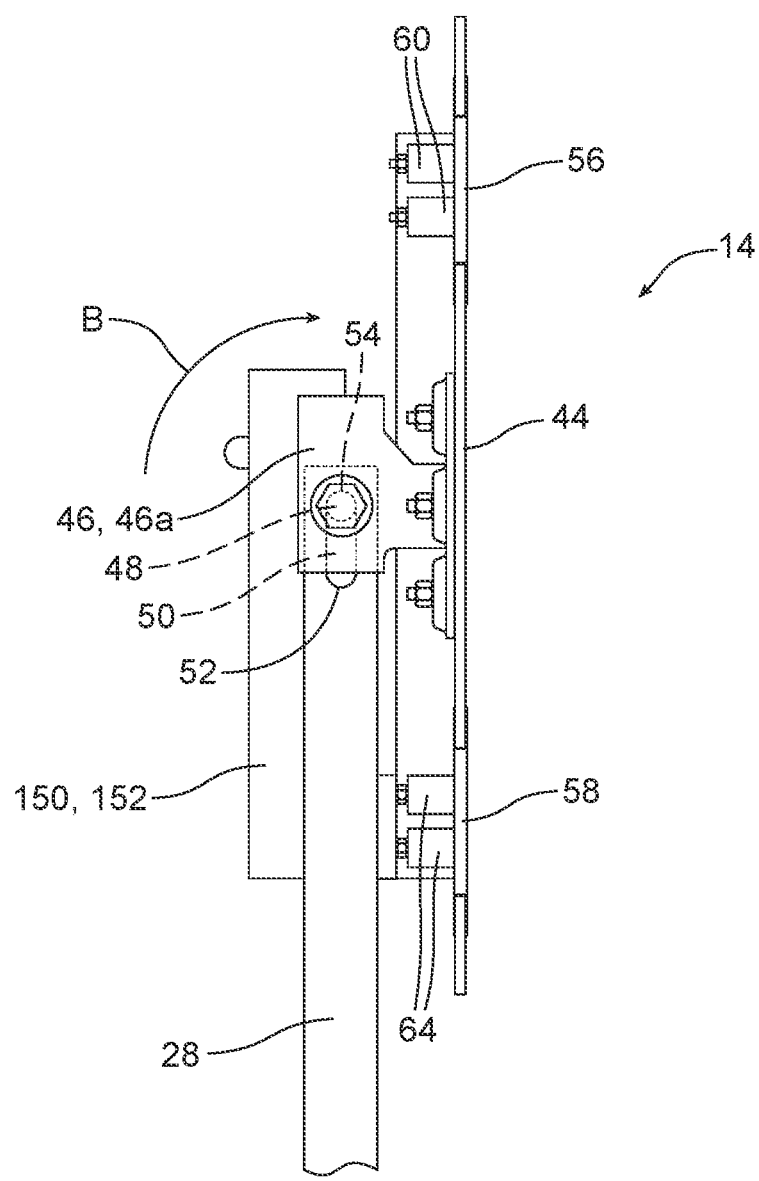
Figure 6C:
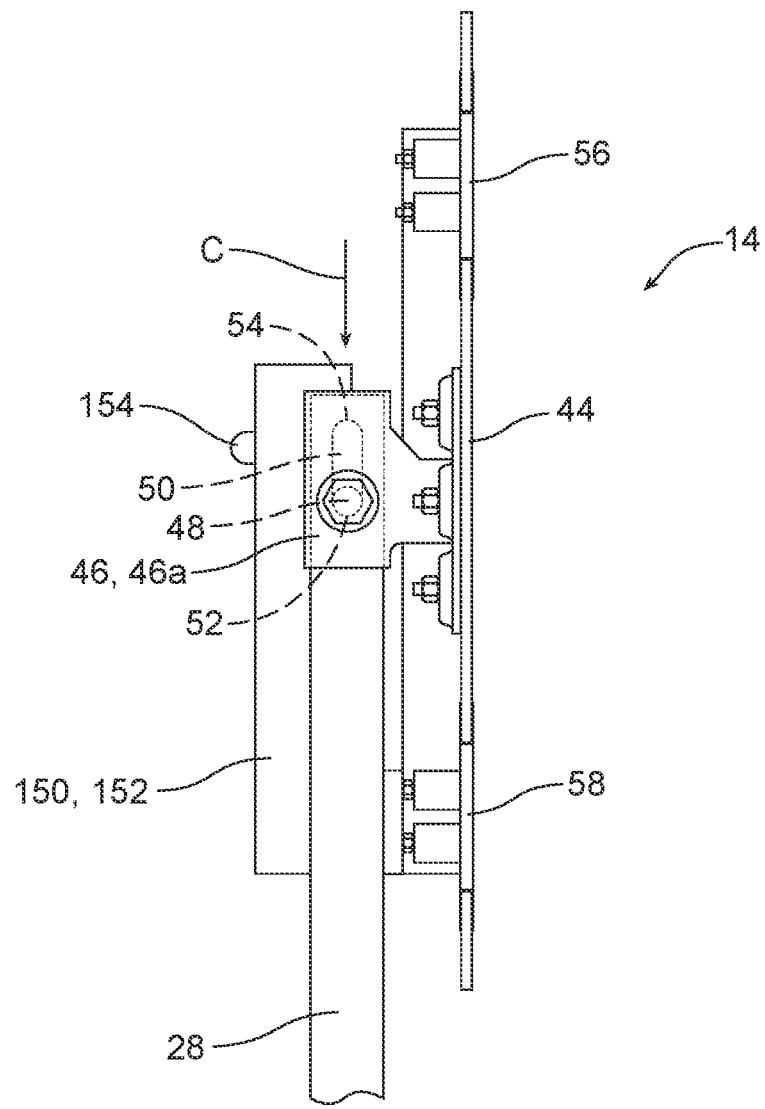
Figure 6D:
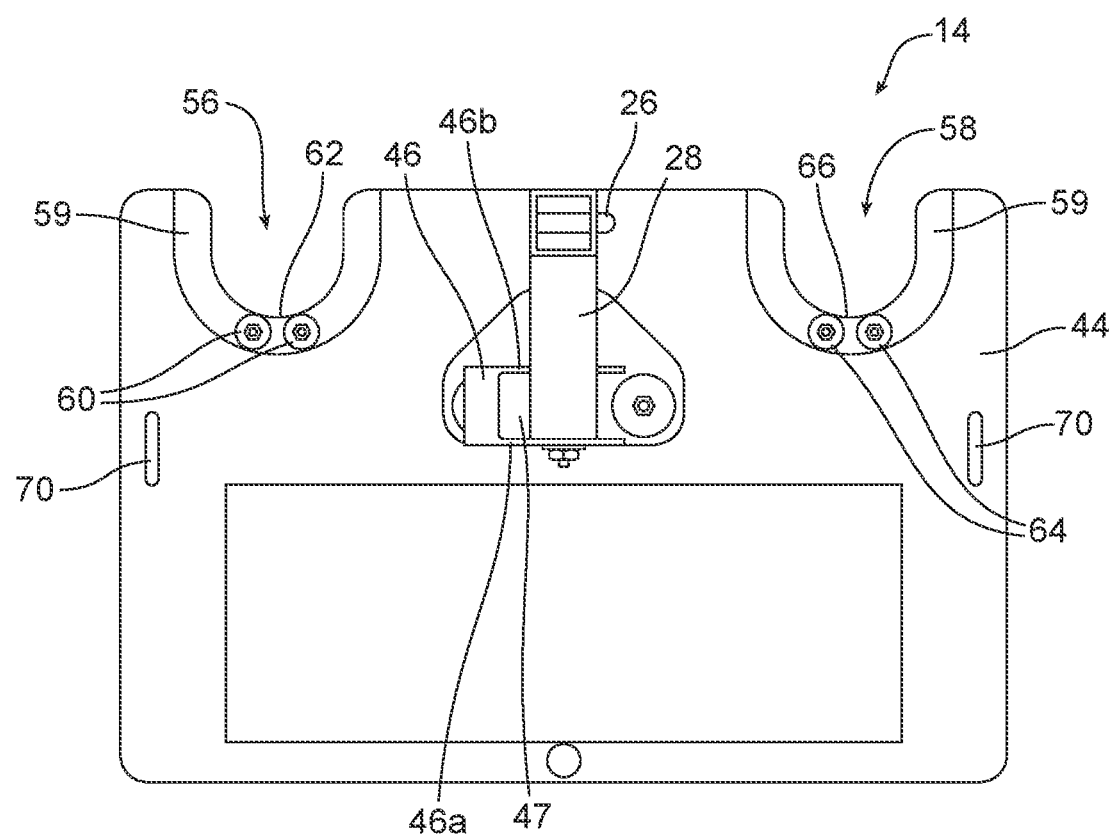
FIG. 6D is a bottom plan view of the tray assembly with the tray in the use position.

The tray 44 may be displaced from the stowed position illustrated in FIG. 6C to the use positon illustrated in FIGS. 1-3 by following the above process in reverse. The tray 44 may only be pivoted when the tray is raised relative to the mounting stalk 28 and the pivot pin 48 is received at the upper end 54 of the elongated slot. This provides clearance for the pivoting movement. In contrast, when the tray 44 is lowered onto the mounting stalk 28 and the pivot pin 48 is at the lower end 52 of the elongated slot 50, there is no clearance to allow pivoting movement in either direction.

As illustrated in FIGS. 1-3 and 6A-6D, the tray 44 also includes a first gun barrel receiver 56 and a second gun barrel receiver 58. As shown, each gun barrel receiver 56, 58 comprises an open ended channel formed in the body of the tray 44. The gun barrel receivers 56, 58 may include a liner 59 made of a soft plastic, a felt cloth or other material that cushions the barrel of any gun held in the receiver. A first magnet 60 is carried on the tray 44 adjacent the closed end of the first gun barrel receiver 56. That magnet 60 is of sufficient strength and positioned so as to bias the gun barrel B held in the first gun barrel receiver toward the closed end 62 of that first open ended channel (See FIG. 3).

Similarly, a second magnet 64 is carried on the tray 44 adjacent the closed end of the second gun barrel receiver 58. That magnet 64 is of sufficient strength and positioned so as to bias any gun barrel held in the second gun barrel receiver toward the closed end 66 of that second open ended channel. The magnetic biasing action provided by the magnets 60, 64 positively assists in maintaining the guns G in the proper, "ready position" on the gun stand 10 so that they may be quickly retrieved and used when desired. At the same time, the biasing force is not of sufficient strength to interfere in any significant way when one wishes to engage and manipulate the gun once a target approaches.

In the embodiment illustrated in FIG. 3, the tray 44 also includes a well 68 in the upper face thereof that may be adapted to hold ammunition M for the gun G. The well 68 may, for example, be sized and shaped to hold two boxes of shot gun shell cartridges if desired.

Figure 8:
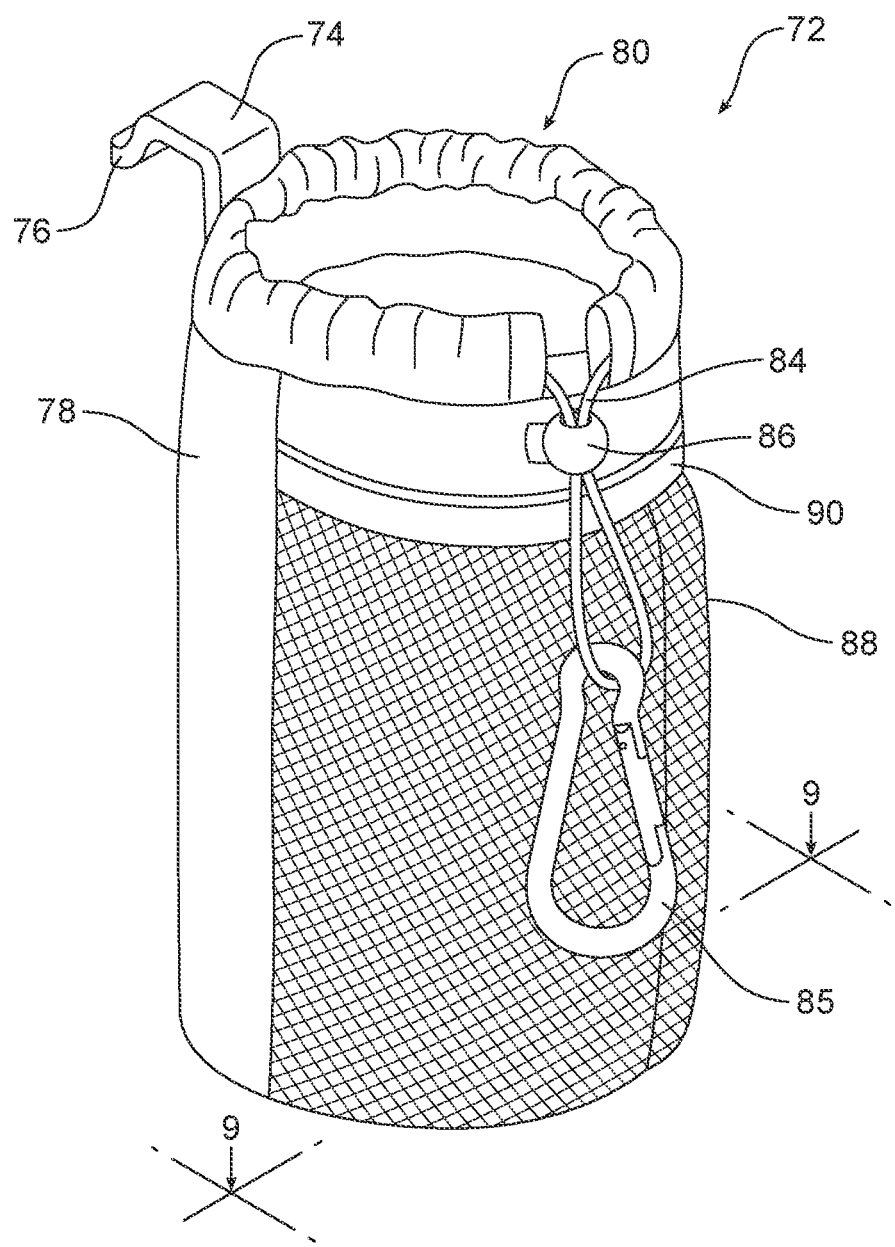
FIG. 8 is a detailed perspective view of the flexible pouch that may be attached to the tray of the gun stand.
Figure 9:
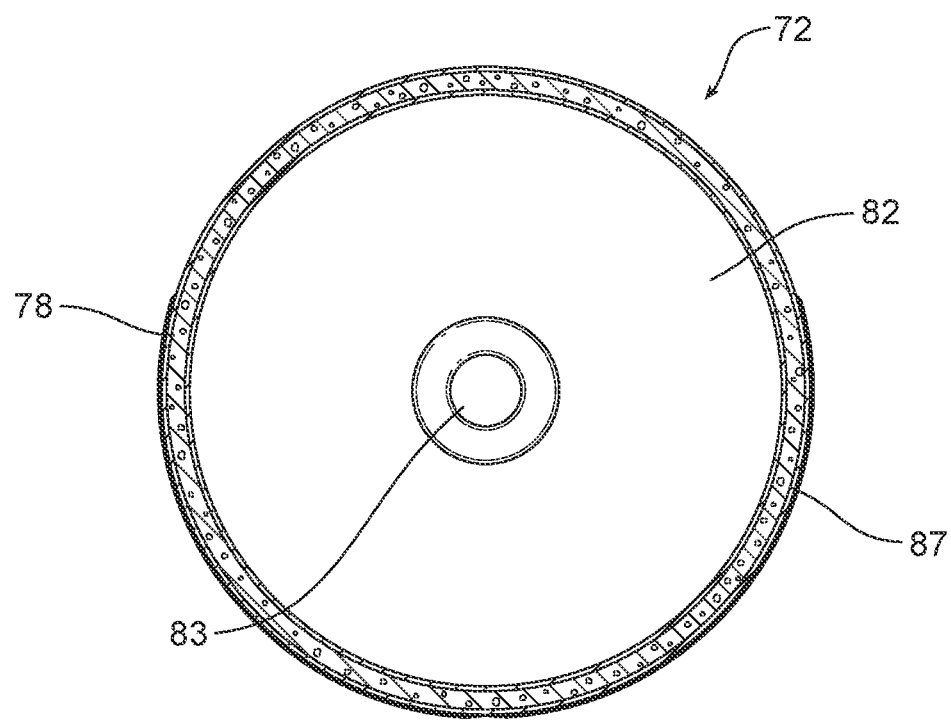
FIG. 9 is a detailed top plan view of the flexible pouch of FIG. 8.

Still further, the tray 44 may include one or more receivers 70 adapted to receive and hold any appropriate gun stand accessory, such as the flexible pouch 72 illustrated in FIGS. 8 and 9. In the illustrated embodiment, each receiver 70 comprises an elongated slot. The flexible pouch 72 may have a rigid mounting arm 74 with an offset lug 76 adapted to be received in the receiver 70 in order to secure the flexible pouch 72 to the tray 44.

The flexible pouch 72, shown in FIGS. 8 and 9, includes a flexible sidewall 78 of fabric or other appropriate material that has an access opening 80 at one end and a bottom wall 82 closing the opposite end (note optional drain hole 83 in bottom wall). The flexible pouch 72 may be sized and shaped to hold, for example, a thermos or drink cup. A cooperating cinch line 84 and latch 86, of a type known in the art, allows one to selectively open and close the access opening 80 as desired. An optional clip or carabiner 85 may be carried on the cinch line 84 and used to engage other items as desired. The flexible pouch 72 may also include an outboard pocket 88 carried on the sidewall 78 that defines the access opening 80. The pocket 88 may be made from a mesh material. An elastic band, strap or the like 90 may be provided along the top edge of the pocket 88 to bias the pocket toward a closed position and better secure items therein.

The gun stand 10 also includes a gun stock support 92 that is carried on the support post 12. When the gun stand 10 is assembled, as illustrated in FIGS. 2 and 3, the gun stock support 92 is positioned between the tray assembly 14 and the ground stake 16. As illustrated in FIGS. 1-3 and 7A-7F, the gun stock support 92 includes a mounting bracket 94 that is adapted to secure the gun stock support 92 to the support post 12. In the illustrated embodiment, the gun stock support 92 is semi-permanently affixed to the support post 12 by a plurality of screws 96.

The gun stock support 92 also includes first and second gun stock receivers 98, 100. Each gun stock receiver 98, 100 comprises a platform having a bottom wall 106 and a sidewall 108. The bottom wall 106 includes apertures 110 to reduce weight and allow for water drainage. The sidewall 108 is not continuous. The sidewall 108 extends around only three sides of the bottom wall 106. The sidewall 108 does not extend along the hinge side. Further, the sidewall 108 breaks at the corners to allow for good drainage.

The gun stock receivers 98, 100 are selectively displaceable between a deployed position, illustrated in FIGS. 1-3, 7A and 7B and a stowed position illustrated in FIGS. 7C-7F. In the deployed position, the gun stock receivers 98, 100 project outwardly from the support post 12. Thus, when the gun stand 10 is anchored in the ground with the ground stake 16 and the post 12 extends in a substantially vertical orientation, the deployed gun stock receivers 98,100 are substantially parallel with the ground. In the deployed position, the sidewall 108 projects upward from the bottom wall 106 exposing a recessed face 112 adapted to receive and hold the butt of a gun stock S: that is, the upwardly projecting sidewall 108 holds the gun stock S on the face 112 preventing the stock from inadvertently sliding off. See FIG. 3 showing the stock S of a gun G resting on and held on the recessed face 112 of the first gun stock receiver 98.

More particularly, a first hinge 114 pivotally mounts the first gun stock receiver 98 to the mounting bracket 94 at one side of the support post 12. Similarly, a second hinge 116 pivotally mounts the second gun stock receiver 100 to the mounting bracket 94 at the opposite side of the support post 12. The gun stock support 92 may also include a latch 118 in the form of an elastic cord 120 having a locking nub 122 carried on a distal end 124 of the cord.

Figure 7A:
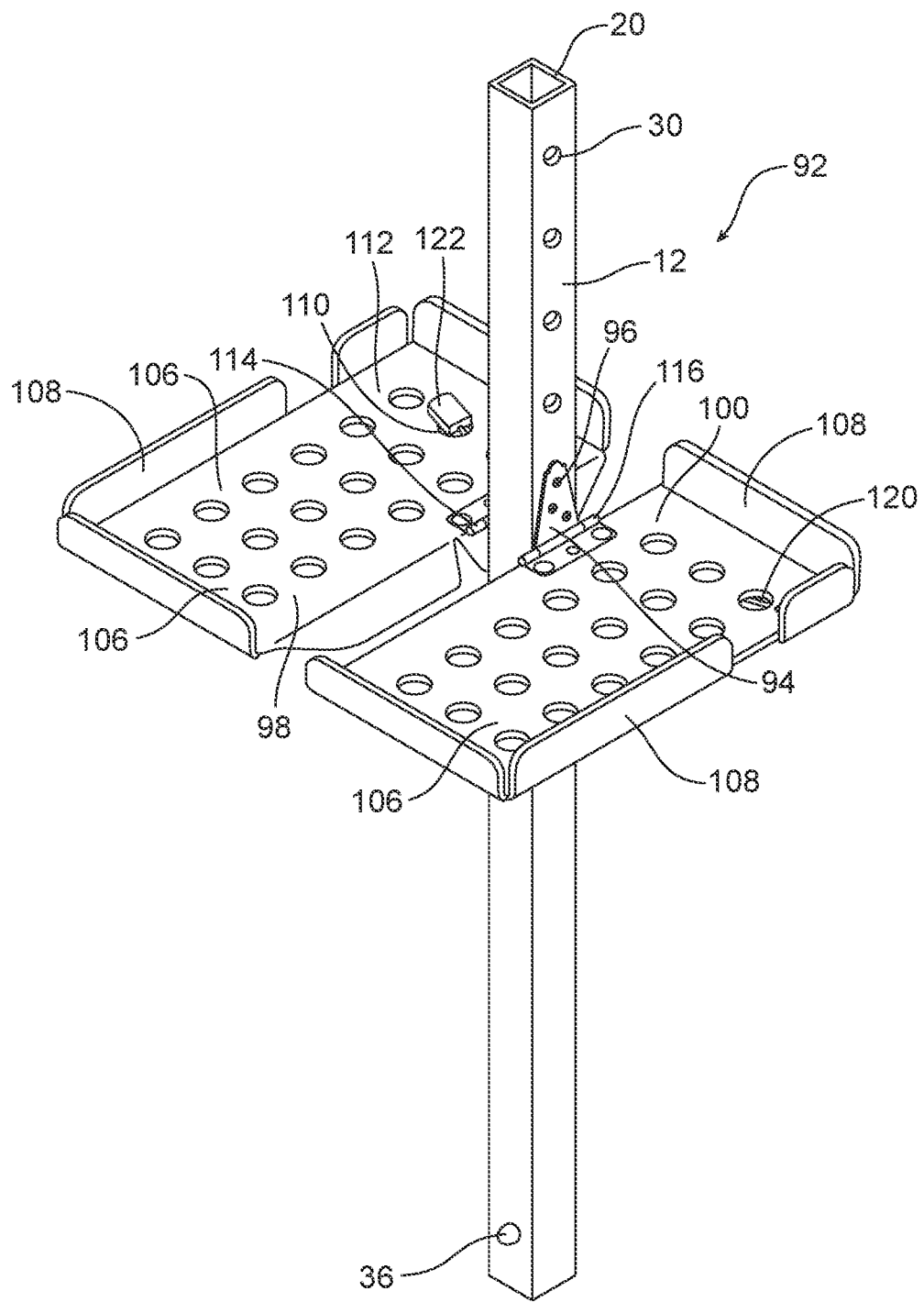
FIGS. 7A-7F are a series of detailed views illustrating how the gun stock support is displaced from the deployed position, adapted for supporting the stock of one or more guns, to the stowed position along the support post to allow for ease of carrying from site to site.
Figure 7B:
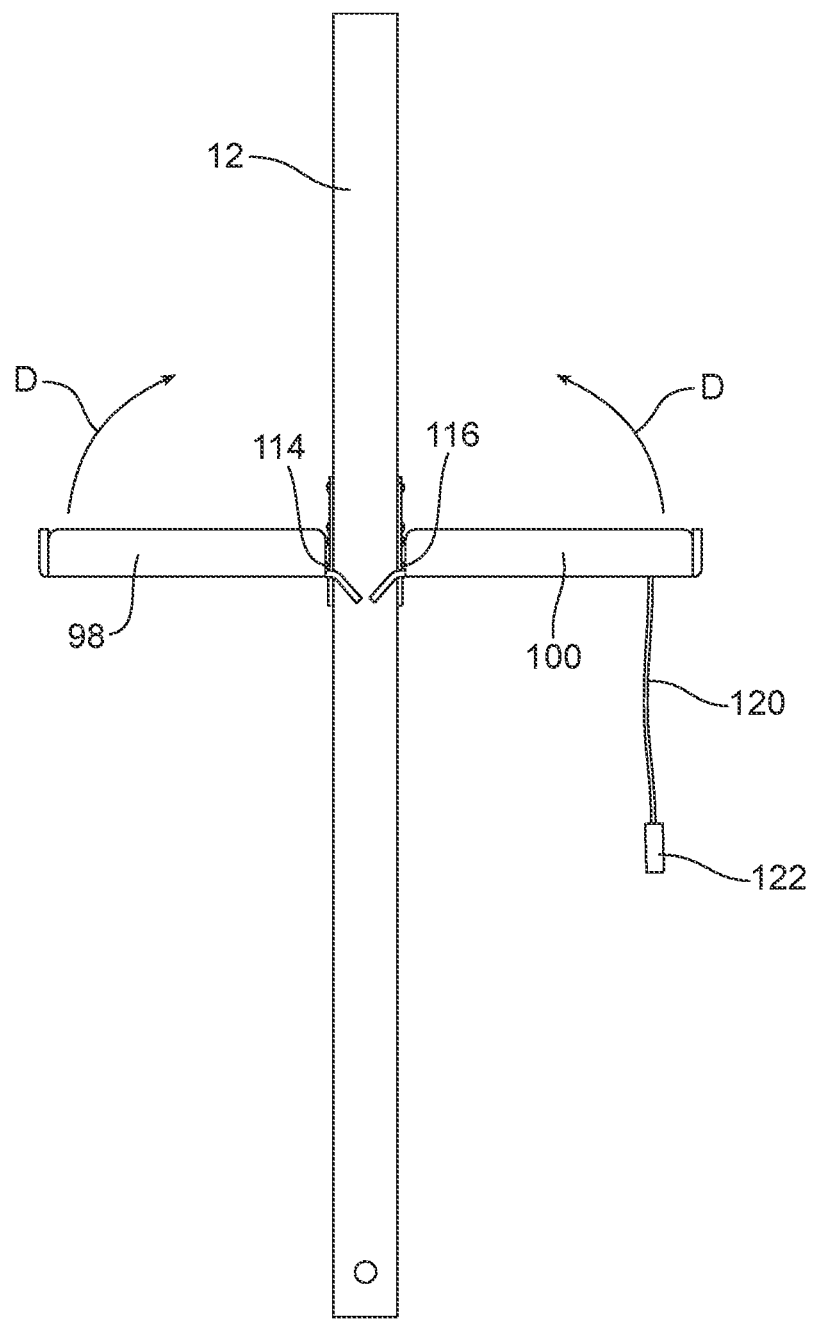

When (a) the gun stand 10 is mounted in the ground with the ground stake 16 and (b) the gun stock receivers 98, 100 are in the deployed position, the pull of gravity and the weight of the receivers tends to hold them open as shown in FIG. 7A. If desired, the latch 118 can also be used for this purpose. Where the proximal end 126 of the cord 120 is fixed to the second gun stock receiver 100, the cord may be stretched under the deployed gun stock receivers 98, 100 and the nub 122 may be pushed through one of the drain apertures 110 in the first gun stock receiver 98. The elastic action of the stretched cord 120 provides a biasing force to hold the receivers 98, 100 fully open in this instance.

When one wishes to displace the gun stock receivers 98,100 from the deployed position shown in FIG. 7A to the stowed position shown in FIGS. 7C-7F, one first removes the nub 122 from the aperture 110, letting the cord 120 fall free from the proximal end 126. Next one pivots the two gun stock receivers 98,100 about the respective hinges 114, 116 (note action arrows D in FIG. 7B) so that they close like a clam shell toward the support post 12.

Figure 7C:
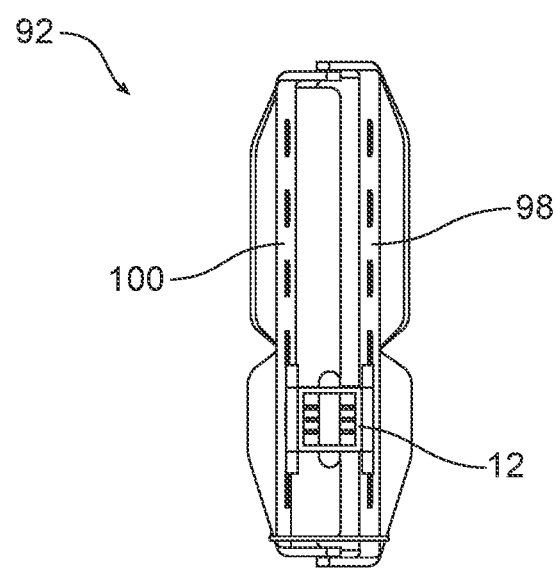
Figure 7D:
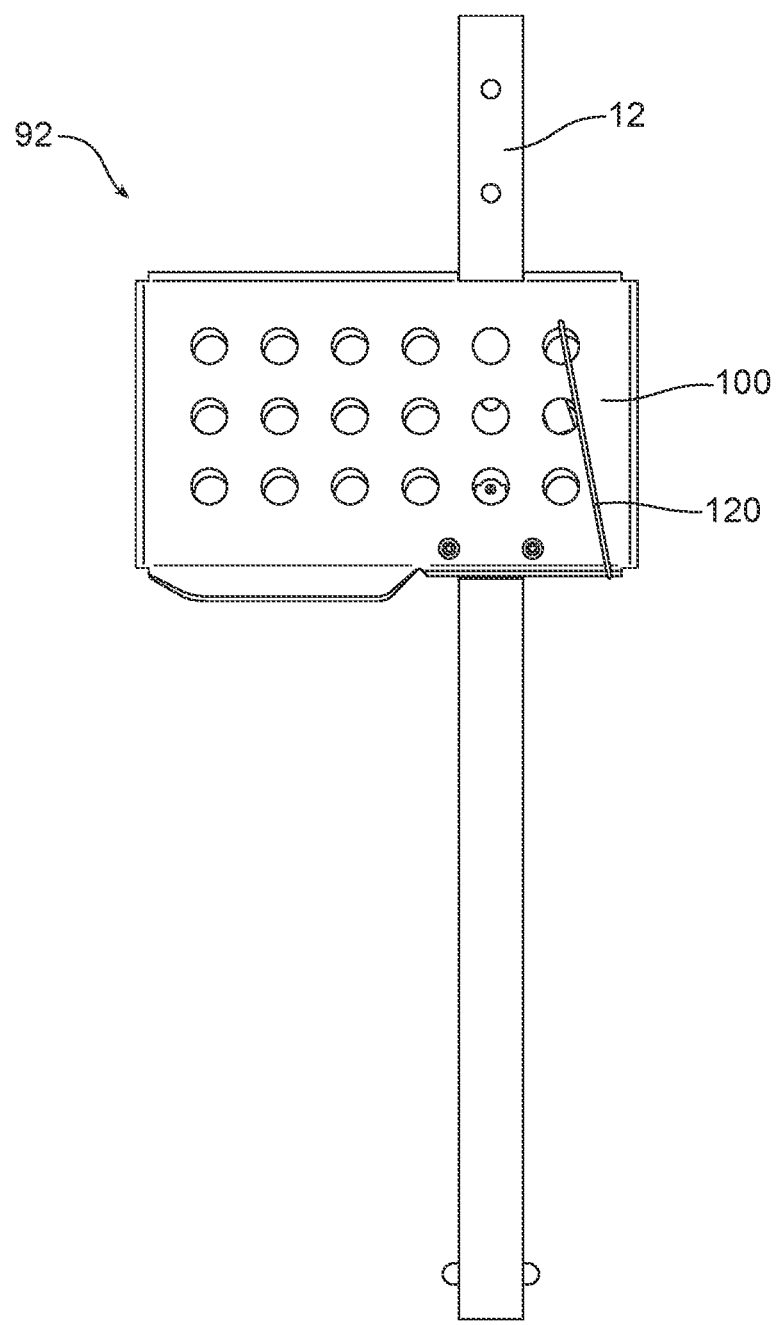
Figure 7E:
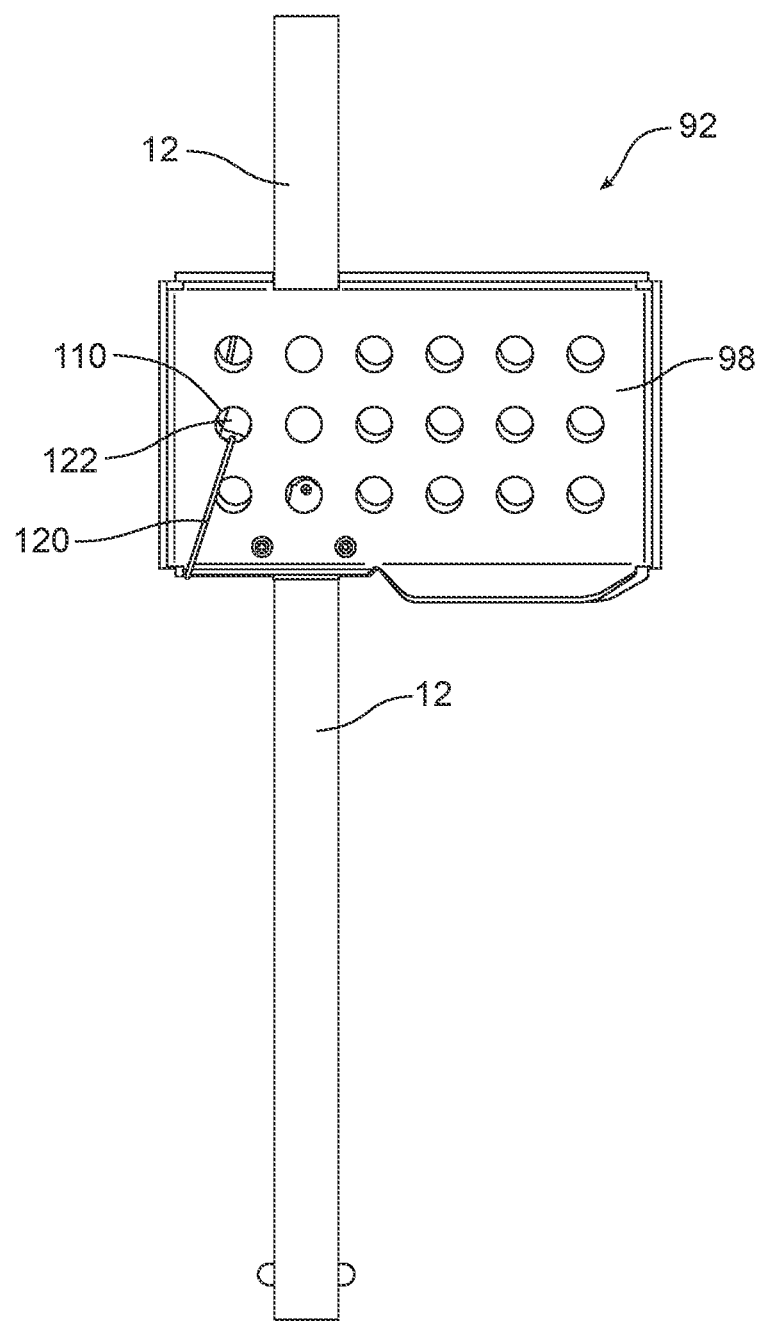
Figure 7F:
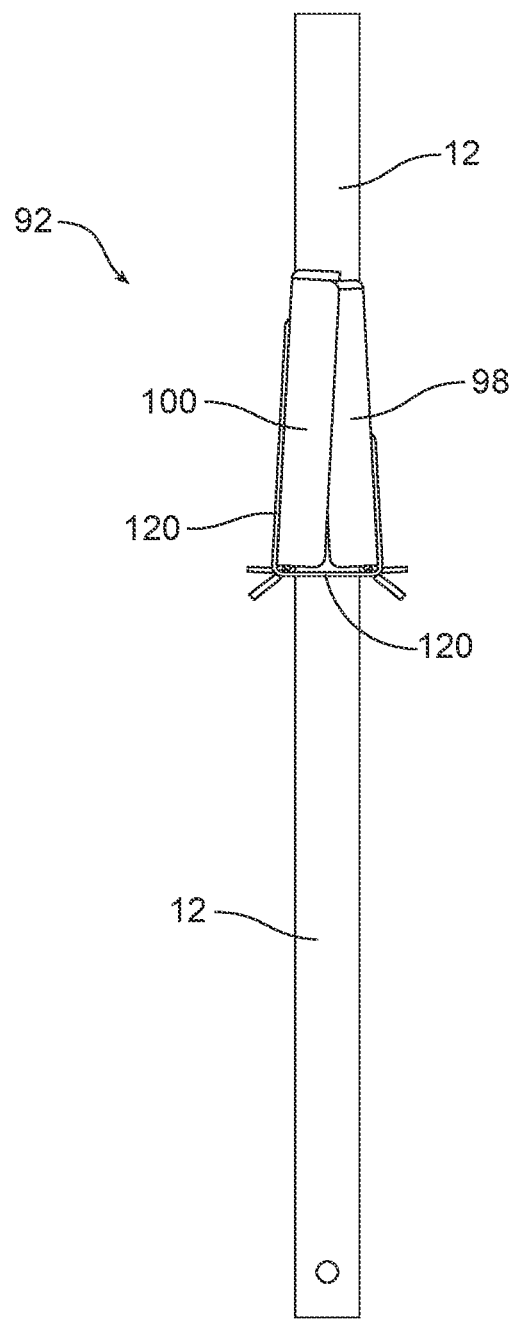

As shown in FIG. 7C, when the gun stock receivers 98, 100 are fully in the stowed position, they nest together (note gun stock receiver 100 at least partially nesting within gun stock receiver 98). The latch 118 may then be used to secure the gun stock receivers 98, 100 in the nested and stowed position. As illustrated in FIGS. 7D-7F this is done by (a) stretching and extending the cord 120 from the mounting point at the proximal end across the back of the second gun stock receiver 100, around the lower edge of the nested receivers 98,100 and partially across the back of the first receiver 98 and (b) inserting the nub 122 into one of the apertures 110 in the first gun stock receiver.

As shown in FIGS. 1-3, the gun stand 10 also includes a ground stabilizer 130 that may be carried on the ground stake 16 above the tapered end 17 thereof that is inserted into the ground. The ground stabilizer 130 includes a mounting element or support 132 adapted to be secured to the ground stake 16 by any appropriate fastener (e.g. screw, bolt, pin . . . not shown). A plurality of mud feet 134 (three in the illustrated embodiment) are arrayed radially around and pivotally attached to the support 132 by means of pivot pins 136. When the stake 16 is fully inserted into the ground G, the mud feet 134 engage the ground in a radial array about the ground stake to provide stability against tipping and thereby tending to support the gun stand 10 in a fully upright position. This is true even when the ground is soft or the gun stand 10 is staked to a pond, lake or river bed in shallow water.

Reference is now made to FIGS. 10 and 11 which illustrate an auxiliary receiver 150 that may be carried on the tray assembly 14. In the illustrated embodiment, the auxiliary receiver 150 is fix to the bottom of the tray 44. The auxiliary receiver 150 is adapted to receive and hold the ground stake 16 when the ground stake is disconnected from the support post 12 to conveniently transport the gun stand 10 in a collapsed or consolidated condition.

Toward this end, the auxiliary receiver 150 has a body 152 dimensioned to correspond in size and shape to the support post 12 so that it may be received and slide into the lumen 42 of the ground stake 16. The auxiliary receiver 150 further includes a third spring loaded detent 154 that projects from a sidewall of the body 152. When the ground stake 16 is positioned on and pressed over the body 152 (see action arrow E in FIG. 10), the spring loaded detent 154 will engage in one of the apertures 38 in the wall of the ground stake 16 thereby securing the ground stake to the auxiliary receiver 150. See FIG. 11. In this secured position, the ground stake 16 extends parallel to and along the side of the mounting stalk 28 and the support post 12.

As also illustrated in FIG. 11, when the collapsed or consolidated gun stand 10 is oriented with the tray 44 upward, gravity pulls the mud feet 134 downward and inward so that they gather around the ground stake 16. An elastic band 160 may be positioned over and around the gathered mud feet 134 and the support post 12 to hold them in this position if desired. In this way, the consolidated or collapsed gun stand 10 is rendered much easier to carry from point to point or site to site.

Upon reaching a desired site, the gun stand 10 may be erected by removing or releasing the elastic band 160, depressing the detent 154 and sliding the ground stake 16 off of the auxiliary receiver 150. The ground stake 16 may then be secured to the support post 12 by means of the second spring-loaded detent 36. Next, the tray 44 may be displaced from the stowed to the use position. The first telescoping connection 18 may be manipulated to independently adjust the first length of the gun stand 10 between the tray 44 and the gun stock support 92 and the second telescoping connection 22 may be manipulated to independently adjust the second length of the gun stand between the gun stock support and the ground stabilizer 130.

The latch 118 may then be released to allow the gun stock receivers 98, 100 of gun stock support 92 to deploy. One may use a foot to push downward on the gun stock receivers 98,100 to help insert the tapered end 17 of the ground stake 16 into the ground G. Once secured in position, the gun stand 10 is ready to receive and hold one or more guns G as shown in FIG. 3. With the butt end of the gun stock S resting securely on the recessed face 112 of one of the gun stock receivers 98, 100, the S-curve 162, provided in the mounting stalk 28, ensures that the gun G leans at a desired angle into the cooperating gun barrel receiver 56, 58 located directly above.

The magnet 60, 64 associated with the adjacent gun barrel receiver 56,58 provides a biasing force to ensure the gun barrel B remains in place in the gun barrel receiver 56, 58 even if the gun stand 10 is inadvertently bumped, jostled by waves or vibrates in the wind. Significantly while the magnet 60,64 helps hold the gun G securely in the gun stand 10 in the desired, upright position, the biasing force is not great enough to interfere with any effort of the user to grab his gun when needed to hunt game.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise. For example, the phrase: "a mud foot", as used herein, may also refer to, and encompass, a plurality of mud feet.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

Terms of approximation, such as the terms about, substantially, approximately, etc., as used herein, refers to ±10% of the stated numerical value.

Although the gun stand of this disclosure has been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. A gun stand, comprising:
   a support post including a first end and a second end;
   a gun stock support, adapted to receive a gun stock, carried on the support post;
   a tray assembly;
   a first telescoping connection connecting the tray assembly to the first end of the support post;
   a ground stake; and
   a second telescoping connection connecting the ground stake to the second end of the support post.

2. The gun stand of claim 1, further including a ground stabilizer carried on the ground stake.

3. The gun stand of claim 2, wherein the gun stock support includes a first gun stock receiver and a second gun stock receiver, the gun stock support being displaceable between a stowed position wherein the first gun stock receiver and the second gun stock receiver nest together along the support post and a deployed position wherein the first gun stock receiver and the second gun stock receiver project outwardly from the support post.

4. The gun stand of claim 3, wherein the gun stock support further includes (a) at least one mounting bracket adapted to secure the gun stock support to the support post, (b) a first hinge pivotally mounting the first gun stock receiver to the at least one mounting bracket and (c) a second hinge pivotally mounting the second gun stock receiver to the at least one mounting bracket.

5. The gun stand of claim 4, wherein the gun stock support further includes a latch adapted to secure the first gun stock receiver and the second gun stock receiver in the stowed position.

6. The gun stand of claim 5, wherein the latch includes a wire cable and a locking pin carried on the wire cable.

7. The gun stand of claim 6, wherein the tray assembly includes a tray, a mounting stalk and a bracket adapted to secure the tray to the mounting stalk.

8. The gun stand of claim 7, further including a pivot pin connecting the bracket to the mounting stalk whereby the tray is displaceable between a stowed position substantially parallel to the mounting stalk and a use position substantially perpendicular to the mounting stalk.

9. The gun stand of claim 8, wherein the tray includes a first gun barrel receiver.

10. The gun stand of claim 9, wherein the tray includes a second gun barrel receiver.

11. The gun stand of claim 10, wherein the tray includes at least one well adapted for receiving and holding gun ammunition.

12. The gun stand of claim 11, wherein the first gun barrel receiver comprises a first open-ended channel formed in the tray and a first magnet carried on the tray adjacent a closed end of the first open-ended channel, said first magnet being adapted to bias a gun barrel toward the closed end of the first open-ended channel.

13. The gun stand of claim 12, wherein the second gun barrel receiver comprises a second open-ended channel formed in the tray and a second magnet carried on the tray adjacent a closed end of the second open-ended channel, said second magnet being adapted to bias a gun barrel toward the closed end of the second open-ended channel.

14. The gun stand of claim 13, further including a flexible pouch having a rigid mounting arm and the tray includes a receiver adapted to releasably receive the mounting arm to secure the flexible pouch on the tray.

15. The gun stand of claim 14, wherein the receiver is an elongated slot and the rigid mounting arm includes an offset lug adapted to be received in the elongated mounting slot.

16. The gun stand of claim 15, wherein the flexible pouch includes an access end and a cooperating cinch line and latch to selectively close and open the access end.

17. The gun stand of claim 16, wherein the flexible pouch further includes at least one outboard pocket carried on a wall defining the access opening.

18. The gun stand of claim 17, wherein the at least one outboard pocket is made from a mesh material.

19. The gun stand of claim 18, further including an elastic lip at a top of the at least one outboard pocket to bias the at least one outboard pocket closed.

20. The gun stand of claim 19, wherein the ground stabilizer includes a plurality of mud feet pivotally attached to a support adapted to engage the ground stake.

21. The gun stand of claim 7, wherein:
    the first telescoping connection includes (a) a first set of spaced apertures in a sidewall of the support post at the first end and (b) a first spring-loaded detent carried on the mounting stalk and adapted to engage in one aperture of the first set of spaced apertures; and
    the second telescoping connection includes (c) a second set of spaced apertures in the ground stake and (d) a second spring-loaded detent carried on the support post adjacent the second end and adapted to engage in one aperture of the second set of spaced apertures: whereby both (i) a first length of the gun stand between the between the tray and the gun stock support and (ii) a second length of the gun stand between the gun stock support and the ground stabilizer can be independently adjusted.

22. The gun stand of claim 1, further including an auxiliary receiver carried on the tray assembly, said auxiliary receiver being adapted to receive and hold the ground stake when the ground stake is disconnected from the support post for transporting the gun stand in a collapsed condition.

23. The gun stand of claim 22, further including a third spring-loaded detent carried on the auxiliary receiver and adapted to engage in one aperture of a set of spaced apertures in the ground stake when the ground stake is held on the auxiliary receiver so as to extend beside and parallel to the support post.

24. A gun stand, comprising:
    a support post;
    a gun stock support, adapted to receive a gun stock, carried on the support post;
    a tray carried at a first end of the support post;
    an auxiliary receiver carried on the tray; and
    a ground stake wherein in a deployed position the ground stake is connected to a second end of the support post and in a transporting position the ground stake is connected to the auxiliary receiver so as to extend parallel to and alongside the support post.

* * * * *